United States Patent
Knaup et al.

(10) Patent No.: US 10,328,931 B2
(45) Date of Patent: Jun. 25, 2019

(54) METHOD FOR OPERATING A HYBRID VEHICLE AND HYBRID VEHICLE

(71) Applicant: Volkswagen Aktiengesellschaft, Wolfsburg (DE)

(72) Inventors: Jörn Christian Knaup, Braunschweig (DE); Vasoontara Thiamtong, Wolfsburg (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 51 days.

(21) Appl. No.: 15/819,946

(22) Filed: Nov. 21, 2017

(65) Prior Publication Data
US 2018/0141541 A1    May 24, 2018

(30) Foreign Application Priority Data
Nov. 21, 2016   (DE) .......................... 10 2016 222 949

(51) Int. Cl.
*B60W 30/18*    (2012.01)
*B60W 20/40*    (2016.01)
(Continued)

(52) U.S. Cl.
CPC .............. *B60W 20/40* (2013.01); *B60L 7/18* (2013.01); *B60L 15/2009* (2013.01);
(Continued)

(58) Field of Classification Search
CPC ...... B60W 20/40; B60W 10/06; B60W 10/08; B60W 30/18072; B60W 30/182;
(Continued)

(56) References Cited

U.S. PATENT DOCUMENTS 7,644,790 B2 *   1/2010   Roske ................... B60K 6/387
                                                                                    180/65.22

FOREIGN PATENT DOCUMENTS

DE           10229035 A1    1/2004
DE    10 2007 035 424 A1    1/2009
(Continued)

OTHER PUBLICATIONS

Search report for German Patent Application No. 10 2016 222 949.4, dated Jul. 26, 2017.

*Primary Examiner* — Gertrude Arthur Jeanglaude
(74) *Attorney, Agent, or Firm* — Pearl Cohen Zedek Latzer Baratz LLP

(57) ABSTRACT

A hybrid vehicle has a drive comprising an internal combustion engine, has an energy converter comprising an electric machine that can be operated for recuperation purposes, and has a control unit that is operatively connected to an operating element, to the drive and to the energy converter. The hybrid vehicle glides when the drive is not in the propulsion mode of operation and with an electric motor operated in a recuperation intensity stage in a first drive state. Based on the control unit having made the determination that the operating element was actuated, the determination is made in the control unit as to whether a condition is present, whereby the duration of the actuation of the operating element is determined and it is determined in a comparison that the duration is below the time threshold value. If the condition is present, a changeover is made from the first drive state to a second drive state in which the hybrid vehicle is then operated.

10 Claims, 3 Drawing Sheets

(51) Int. Cl.
- *B60W 10/06* (2006.01)
- *B60W 10/08* (2006.01)
- *B60W 30/182* (2012.01)
- *B60L 7/18* (2006.01)
- *B60W 50/06* (2006.01)
- *B60W 50/10* (2012.01)
- *B60L 15/20* (2006.01)
- *B60W 20/14* (2016.01)
- *B60L 50/15* (2019.01)

(52) U.S. Cl.
CPC ............ *B60L 50/15* (2019.02); *B60W 10/06* (2013.01); *B60W 10/08* (2013.01); *B60W 20/14* (2016.01); *B60W 30/182* (2013.01); *B60W 30/18072* (2013.01); *B60W 30/18127* (2013.01); *B60W 50/06* (2013.01); *B60W 50/10* (2013.01); B60L 2240/80 (2013.01); B60W 2030/1809 (2013.01); B60W 2510/06 (2013.01); B60W 2510/08 (2013.01); B60W 2520/10 (2013.01); B60W 2540/04 (2013.01); *B60W 2540/12* (2013.01); *B60W 2540/16* (2013.01); *B60W 2710/06* (2013.01); *B60W 2710/08* (2013.01); *B60W 2710/083* (2013.01); *Y10S 903/93* (2013.01)

(58) Field of Classification Search
CPC ......... B60W 2510/08; B60W 2520/10; B60W 2540/12; B60W 2710/06; B60W 2710/08; B60L 7/18; B60L 2240/80; Y10S 903/93
USPC ........................................................ 701/22
See application file for complete search history.

(56) References Cited

FOREIGN PATENT DOCUMENTS

| | | |
|---|---|---|
| DE | 10 2010 062 756 A1 | 6/2012 |
| DE | 10 2014 201 353 A1 | 7/2015 |
| EP | 2 620 339 B1 | 8/2015 |
| EP | 2 675 677 B1 | 6/2016 |
| WO | WO 2015 043996 A1 | 4/2015 |

* cited by examiner

METHOD FOR OPERATING A HYBRID VEHICLE AND HYBRID VEHICLE

CROSS REFERENCE TO RELATED APPLICATIONS

This application claims the benefit of German Patent Application No. 10 2016 222 949.4, filed Nov. 21, 2016, the contents of which are hereby incorporated by reference.

FIELD OF THE INVENTION

The invention relates to a method for operating a hybrid vehicle. Moreover, the invention relates to a hybrid vehicle.

BACKGROUND OF THE INVENTION

In order to optimize consumption during the operation of vehicles powered by internal combustion engines, especially hybrid vehicles, it is quite common practice to allow the vehicle to glide over certain distances while free-wheeling without propulsion, optionally even with the internal combustion engine switched off. A typical termination condition of this drive state is the actuation of the brake pedal or the actuation of rocker switches on the steering wheel, whereby the drive changes over to the propulsion mode of operation, optionally after switching on the internal combustion engine.

The termination can also be linked to other conditions.

For example, European patent specification EP 2 620 339 B1 discloses a control unit for the gliding mode of operation of a hybrid vehicle with the internal combustion engine switched off. In order to reduce the fuel consumption and to increase the driving comfort of the hybrid vehicle, the hybrid vehicle can be operated in a free-wheeling state with the internal combustion engine switched off. A termination condition of this state is fulfilled when the brake pedal is actuated so strongly that the hybrid vehicle is decelerated beyond a prescribed deceleration threshold is effectuated. Another termination condition comprises the vehicle speed falling below a speed threshold.

For example, German patent application DE 10 2010 062 756 A1 describes a motor vehicle with an evaluation unit for recognizing a braking intention on the part of the driver before the brake pedal is actuated, so that, as a function of the intention, the gliding mode of operation or the propulsion mode of operation is activated, or else a switch is made between these modes of operation. A condition is considered to be the duration of the presence of an intention to brake or a preparedness to brake: if the intention to brake or the preparedness to brake is present for a duration that is longer than a prescribed threshold, then the propulsion mode of operation takes place. If only a duration that is shorter than the prescribed threshold is present, then the gliding mode of operation becomes active.

A drawback is that the described solutions do not permit an intentional changeover between various drive states of the hybrid vehicle.

SUMMARY OF THE INVENTION

Before this backdrop, it is the objective of the present invention to put forward a method for operating a hybrid vehicle in which a user of the hybrid vehicle can intentionally influence the free-wheeling and/or propulsion behavior of the hybrid vehicle.

This objective is achieved according to the invention by a method for operating a hybrid vehicle, said method having the features according to claim 1. Advantageous refinements of the invention are characterized in the dependent claims. The features individually elucidated in the patent claims can be combined with each other in a technologically meaningful manner and can be augmented by explanatory elaborations presented in the description and/or in details from the figures, whereby additional embodiments of the invention are put forward.

The method according to the invention for operating a hybrid vehicle relates to a hybrid vehicle, especially to a trackless hybrid land vehicle, having a drive comprising an internal combustion engine, an energy converter comprising an electric machine that can be operated for recuperation purposes, and having a control unit that is operatively connected to an operating element, to the drive and to the energy converter. The method according to the invention comprises the following steps:

the hybrid vehicle glides when the drive is not in the propulsion mode of operation and with an electric motor operated in a recuperation intensity stage in a first drive state, an actuation of the operating element is determined by the control unit, the determination is made in the control unit on the basis of the actuation as to whether a condition, especially a prescribed and/or quantitative condition, is present, and if the condition is present, a changeover is made from the first drive state to a second drive state, and the hybrid vehicle is operated in the second drive state. According to the invention, the determination of the presence of the condition entails that a duration—a period of time—of the actuation of the operating element is determined, the duration is compared to a time threshold value and the determination is made that—that is to say, whether—the duration is below the time threshold value. In other words, the presence of the condition is determined—positively or negatively—in that a duration of the actuation of the operating element is determined, the duration is compared to a time threshold value and the determination is made that the duration is below the time threshold value.

No additional operating elements are needed with the approach according to the invention. An already present operating element can be used by the special nature of the actuation in order to achieve the desired influence on the drive state, on the free-wheeling and/or propulsion behavior by a user of the hybrid vehicle, for example, the driver. In this manner, an intuitive or self-explanatory operating option can be created in certain embodiments.

The electric motor can be part of another drive of the hybrid vehicle. In other words, the electric motor can be configured to power the hybrid vehicle. The recuperation is also referred to as energy recovery.

The determination of the actuation of the operating element can especially comprise the aspect that the end or the completion of the actuation of the operating element is also determined. In other words, the entire sequence of the actuation of the operating element all the way to the end of the actuation is taken into consideration.

The condition is not present when the duration is above the threshold value. In particular, the condition can be present or not present if the duration is precisely equal to the threshold value. The changeover is made from the first to the second drive state, especially at the time of the end of the actuation of the operating element.

In particular, the second drive state is different from the first drive state. The level of a recuperation intensity stage especially implies a certain magnitude of the generative output of the electric motor or of the braking torque brought about by the electric motor. There can be a plurality of recuperation intensity stages, for example, a small number such as two, three, four or five. One of the intensity stages can also be the recuperation intensity of zero, that is to say, operation without recuperation.

The electric motor of the energy converter of the hybrid vehicle can be battery-powered and/or fuel cell-powered. The hybrid vehicle can be a plug-in hybrid vehicle. It can especially be a mild hybrid vehicle, that is to say, a hybrid vehicle in which the second drive assists the first drive or—especially preferably—it can be a micro hybrid vehicle, in other words, a hybrid vehicle in which the electric motor is designed only to charge a battery (e.g. starting generator). The method according to the invention is especially advantageous in a micro hybrid vehicle with a 12-V onboard network, among other things, because it is an inexpensive solution without additional operating elements.

In the method according to the invention for operating a hybrid vehicle, in the first drive state, the hybrid vehicle can be operated by the engaged drive while free-wheeling, whereby the internal combustion engine of the drive can be idling, and/or the hybrid vehicle can be operated in the first drive state with the drive switched off. During free-wheeling, especially the drive component is decoupled or uncoupled from the driven component with respect to the driven part of the chassis.

In a group of preferred embodiments of the method for operating a hybrid vehicle, in the second drive state, the drive is operated in the propulsion mode, whereby the drive is switched on or has already been switched on.

In addition or as an alternative to this, in embodiments of the method according to the invention, in the second drive state, the electric motor is operated in a different recuperation intensity stage. The other intensity stage can especially be a lower or (preferably) higher intensity stage than the intensity stage in the first drive state.

In certain embodiments, in a supplementary method step, the hybrid vehicle is operated in a third drive state—especially after being operated in the second drive state—in which the drive is in the traction mode of operation of operation and a recuperation intensity stage of the electric motor is lowered especially to the lowest intensity stage, optionally an intensity stage without recuperation.

In an advantageous group of embodiments of the method according to the invention, the determination of the presence of the condition also entails that an intensity of the actuation of the operating element is determined, that the intensity is compared to an intensity threshold value, and that the determination is made that the intensity is above the intensity threshold value. The intensity of the actuation can be a measure of the intensity of a deceleration or of a deceleration intention involving the hybrid vehicle. In particular, the intensity of the actuation can bring about a proportional increase in the deceleration.

The intensity can be determined indirectly in that the braking pressure in a braking system of the hybrid vehicle is measured. As an alternative, the intensity can be determined directly in that the intensity exerted on the operating element, for example, the force exerted, the distance traversed or the pressure applied, is empirically determined. The intensity can also be referred to as the strength.

In an advantageous refinement of the method, the time threshold value is varied as a function of the speed of the hybrid vehicle. Furthermore, in another embodiment, the intensity threshold value can be varied as a function of the speed of the hybrid vehicle. This augmentation is especially relevant for hybrid vehicles in which the gliding mode of operation is only active up to a limit pressure of the braking pressure in a braking system supplied with negative pressure, insofar as, at higher braking pressures, the negative pressure supply has to be ensured by a propulsion mode of operation of the internal combustion engine. At lower speeds, the requirement made of the negative pressure supply is less in such hybrid vehicles. In order to allow a deceleration of the hybrid vehicle until it comes to a standstill, while the internal combustion engine is switched off and/or while the drive is not in the propulsion mode of operation, the intensity threshold value and/or the time threshold value are raised. In this manner, the availability of the free-wheeling is increased when the internal combustion engine is switched off.

A hybrid vehicle also falls within the scope of the inventive idea. The hybrid vehicle according to the invention, especially a trackless hybrid land vehicle, has a drive comprising an internal combustion engine, it has an energy converter comprising an electric machine that can be operated for recuperation purposes, and it has a control unit that is operatively connected to an operating element, to the drive and to the energy converter. The control unit comprises a computing unit and a memory unit. According to the invention, the memory unit contains a program that, at least if it is partially executed in the computing unit, executes a method for operating the hybrid vehicle, said method having features or feature combinations according to this presentation.

The operating element is especially an operating element for a deceleration device, for example, a braking system, of the hybrid vehicle. In concrete embodiments of the hybrid vehicle according to the invention, the operating element is a pedal, especially a brake pedal, a selector lever, a manual switch, for example, a rotary switch, a toggle switch or a rocker, or a touch panel, for example, a touch screen.

Additional advantages and advantageous embodiments and refinements of the invention are explained in greater detail on the basis of the description below with reference to the figures. The following is shown in detail:

DETAILED DESCRIPTION OF THE INVENTION

Figure 1:
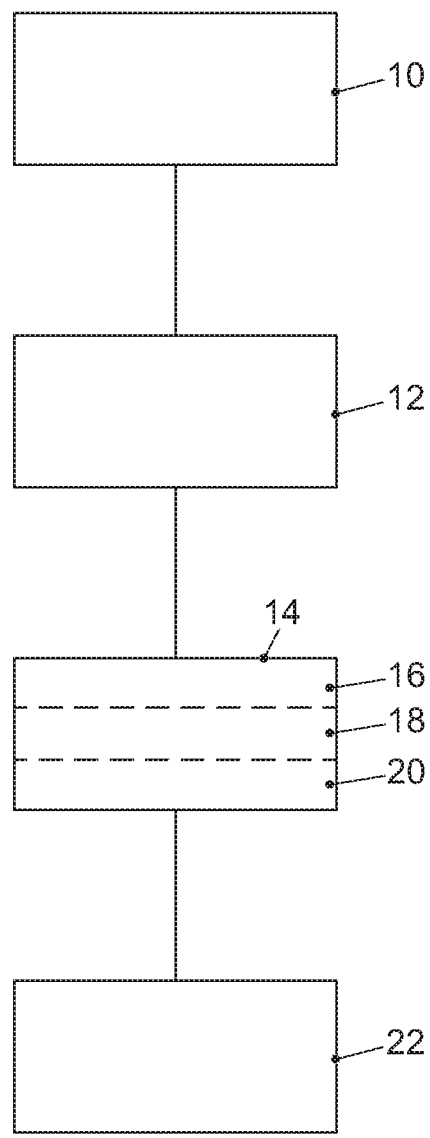
FIG. 1 is a sequence diagram of a preferred embodiment of the method according to the invention.

FIG. 1 is a sequence diagram of a preferred embodiment of the method according to the invention for operating a hybrid vehicle. The hybrid vehicle has a topology of the type described below, taking into consideration the schematic view of Figure below 3, and it has a programmed or programmable control unit that can execute the method sequence. Preferably, it is a micro hybrid vehicle.

Initially, the hybrid vehicle according to the invention is operated in a first drive state (Step 10). In this first drive state, the hybrid vehicle glides when the drive is not in the propulsion mode of operation, in the free-wheeling mode with the drive switched off, and without an operated recuperative electric motor, in other words, at a recuperation intensity stage of zero. In Step 12, an actuation of the operating element—in this preferred embodiment an actuation of the brake pedal—is determined by the control unit of the hybrid vehicle. This determination is initially qualitative and it constitutes a starting condition for the quantitative evaluation of the nature of the actuation. Then, in the control unit of the hybrid vehicle, the determination is made on the basis of the actuation as to whether a prescribed condition has been fulfilled (Step 14). Step 16 comprises individual sub-steps or sub-sequences. It is determined how long the brake pedal has been actuated (Sub-step 16). The determined time duration is compared to a time threshold value (Sub-step 18). Then the determination is made as to whether—that is to say that—the duration is below the time threshold value (Sub-step 20). The determination can entail that a variable in the control unit is set to a value that characterizes the fact that the magnitude has fallen below the time threshold value. If it is determined in the control unit that the condition is present, then the first drive state is changed over to the second drive state (Step 22). The hybrid vehicle is then operated in the second drive state, whereby the drive is switched on and then the drive is used in the propulsion mode of operation.

Figure 2A:
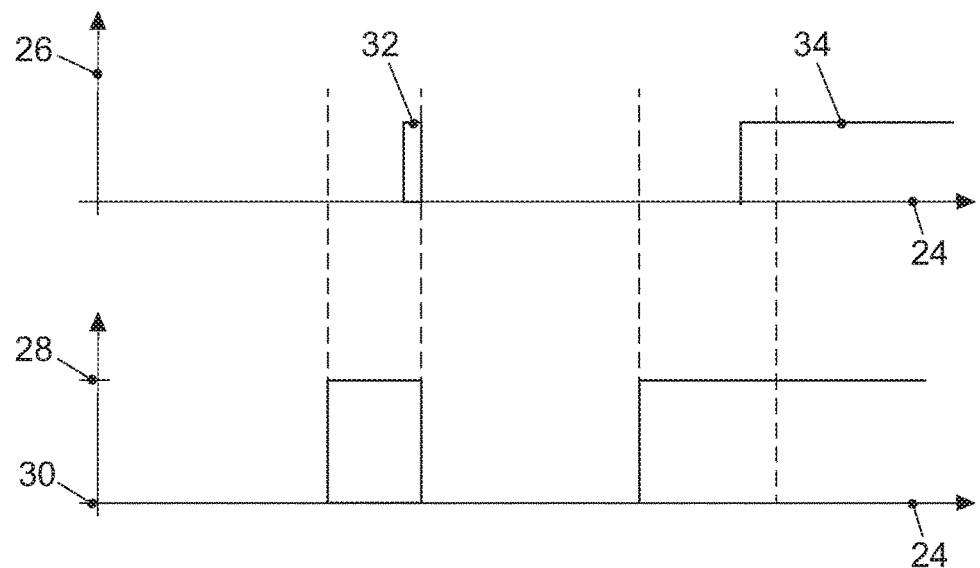
FIGS. 2A and 2B are diagrams in two partial drawings to illustrate the changeover from the first drive state to the second drive state as a function—according to the invention—of a time threshold value or of an intensity threshold value.
Figure 2B:
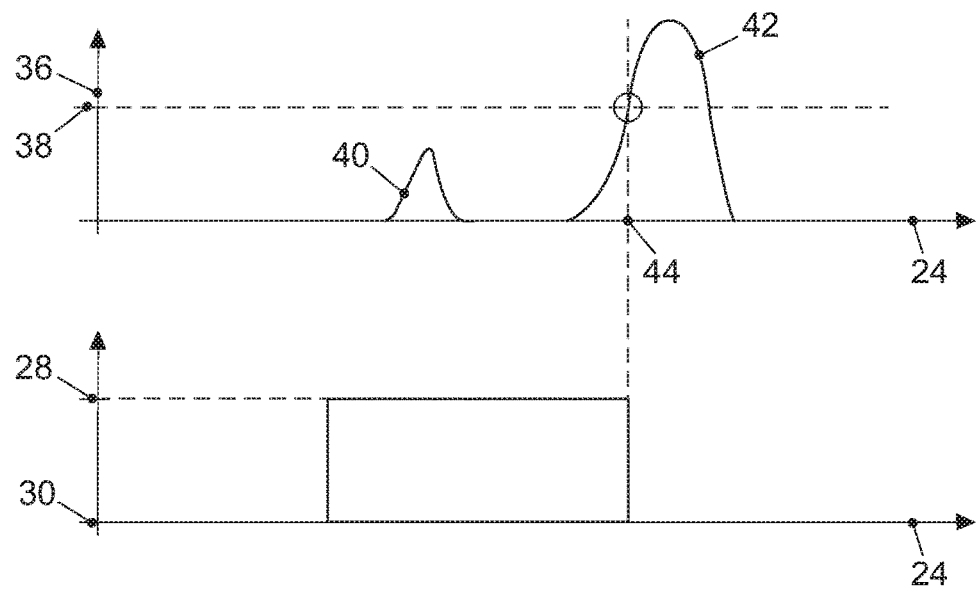

FIG. 2 shows diagrams in two partial drawings FIGS. 2A and 2B to illustrate the changeover from the first drive state to the second drive state as a function—according to the invention—of a time threshold value or of an intensity threshold value.

The partial drawing FIG. 2A groups two diagrams. As a function of the time 24, whose course should not be viewed quantitatively but rather only by way of an example, the actuation 26 of the operating element is plotted qualitatively in the upper diagram of the partial drawing FIG. 2A. If an actuation is present, a value that is not equal to zero is depicted in the diagram. The drive states are plotted qualitatively in the lower diagram of the partial drawing FIG. 2A. The first drive state 28 is depicted at a high level, and the second drive state 30 is depicted at a low level along the axis. Over the course of the time 24, a first changeover is made from the second drive state 30 to the first drive state 28 in the left-hand area of the partial drawing FIG. 2A. During operation in the first drive state, an actuation 26 of the operating element takes place for a short duration 32. According to the invention, the short duration 32 is evaluated and it is shorter than the time threshold value. Then the first drive state 28 is changed over to the second drive state 30. Over the further course of the time 24, a second changeover is made from the second drive state 30 to the first drive state 28 in the right-hand area of the partial drawing FIG. 2A. During operation in the first drive state, an actuation 26 of the operating element takes place for a long duration 34. According to the invention, the long duration 34 is evaluated and it is longer than the time threshold value. The hybrid vehicle remains in the first drive state 28. No changeover is made to the second drive state 30.

The partial drawing FIG. 2B likewise groups two diagrams. As a function of the time 24, whose course cannot be seen quantitatively but rather only by way of an example, the intensity 36 of the actuation of the operating element is plotted quantitatively with the appropriate unit in the upper diagram of the partial drawing FIG. 2B. An intensity threshold value 38 is drawn in the diagram. As explained above, the intensity threshold value 38 is a function of the speed of the hybrid vehicle. The drive state is plotted qualitatively in the lower diagram of the partial drawing FIG. 2B. The first drive state 28 is shown at a high level, and the second drive state 30 is shown at a low level along the axis. Over the course of the time 24, a changeover is made from the second drive state 30 to the first drive state 28. During operation in the first drive state 28, over the course of the time 24, a first, weak actuation 40 of the operating element, which does not exceed the intensity threshold value 38, takes place. According to the invention, the hybrid vehicle remains in the first drive state 28. Over the further course of the time 24, a sufficiently intense actuation 42 of the operating element takes place. The intensity 36 reaches the intensity threshold value 38 at a point in time 44. According to the invention, as a consequence, a changeover is made from the first drive state 28 to the second drive state 30, and the hybrid vehicle is then operated further in the second drive state 30. In this manner, correction braking operations are made possible according to the invention, without leaving the first drive state 28.

Figure 3:
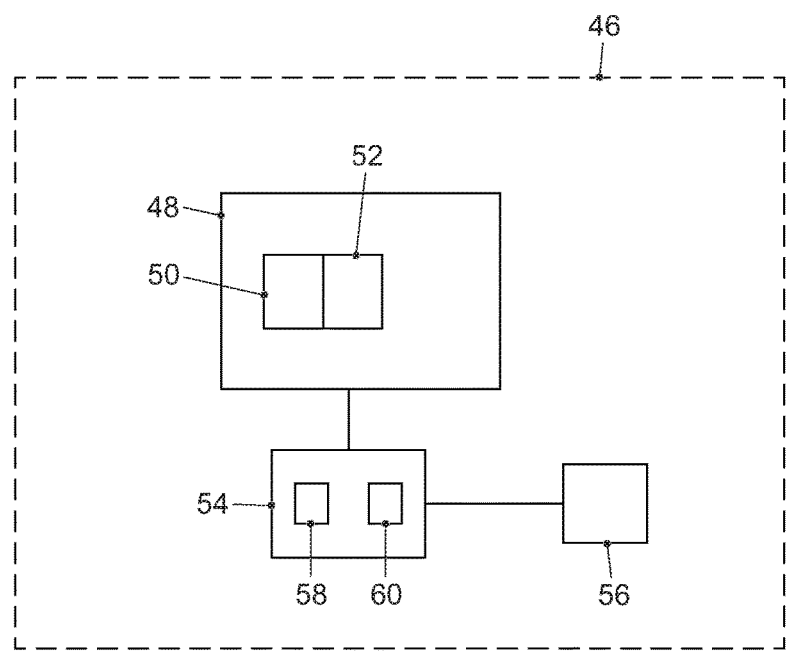
FIG. 3 is a schematic view of the topology of a hybrid vehicle according to the invention.

FIG. 3 schematically shows the topology of a hybrid vehicle 46 according to the invention, preferably a micro hybrid vehicle. The hybrid vehicle 46 has a drive 48 comprising an internal combustion engine 50 and an energy converter 52 with an electric motor. In the case of micro hybrid vehicles, the energy converter 52 with the electric motor is a starter-generator. The electric motor can be operated for purposes of recuperation or for recovering energy in electric form. Moreover, the hybrid vehicle has a control unit 54 that is operatively connected—a signal connection—to an operating element 56, here preferably the brake pedal of the hybrid vehicle, and to the drive 48. In the preferred topology shown in FIG. 3, especially the micro hybrid vehicle, the energy converter 52 is part of the drive 48, so that the control unit 54 that is operatively connected to the drive is also operatively connected to the energy converter 52. The control unit 54 comprises a computing unit 58 and a memory unit 60. According to the invention, a program is stored in the memory unit 60. The program can be part of the motor control program. When at least parts of the program are executed in the computing unit 58, a method, as elucidated above with reference to FIG. 1, is carried out.

LIST OF REFERENCE NUMERALS

10 operation in the first drive state
12 actuation of an operating element
014 determination of a condition
16 determination of a duration
18 comparison to a time threshold value
20 determination of the condition
22 changeover to and operation in the second drive state
24 time
26 actuation of the operating element
28 first drive state
30 second drive state
32 short duration
34 long duration
36 intensity
38 intensity threshold value
40 weak actuation
42 sufficiently strong actuation
44 point in time when the intensity threshold value is reached 46 hybrid vehicle
48 drive
50 internal combustion engine
52 energy converter
54 control unit
56 operating element
58 computing unit
60 memory unit

The invention claimed is:

1. A method for operating a hybrid vehicle comprising a drive, an operating element, and a control unit connected to the drive and operating element, wherein the drive comprises an internal combustion engine and an energy converter, and the energy converter comprises an electric machine operated for recuperation purposes, the method comprising the following steps:
gliding the hybrid vehicle when the drive is not in a propulsion mode of operation and when an electric motor is operated in a recuperation intensity stage in a first drive state,
determining, by the control unit, a duration of an actuation of the operating element,
determining, by the control unit, whether a condition is present by determining if the duration is below a time threshold value, and
when the condition is present, changing over from the first drive state to a second drive state, and operating the hybrid vehicle in the second drive state.

2. The method for operating a hybrid vehicle according to claim 1, further comprising, in the first drive state, operating the hybrid vehicle by engaging the drive while free-wheeling and/or operating the hybrid vehicle with the drive switched off.

3. The method for operating a hybrid vehicle according to claim 1, further comprising, in the second drive state, switching on the drive and operating the drive in the propulsion mode of operation, or operating the drive in the propulsion mode of operation when the drive has already been switched on.

4. The method for operating a hybrid vehicle according to claim 1, further comprising, in the second drive state, operating the electric motor in a different recuperation intensity stage.

5. The method for operating a hybrid vehicle according to claim 1, further comprising operating the hybrid vehicle in a third drive state in which the drive is in a traction mode of operation and a recuperation intensity stage of the electric motor is lowered.

6. The method for operating a hybrid vehicle according to claim 1, further comprising varying the time threshold value as a function of the speed of the hybrid vehicle.

7. The method for operating a hybrid vehicle according to claim 1, wherein determining whether the condition is present further comprises:
determining an intensity of the actuation of the operating element,
comparing the intensity to an intensity threshold value, and
determining whether the intensity is above the intensity threshold value.

8. The method for operating a hybrid vehicle according to claim 7, further comprising varying the intensity threshold value as a function of the speed of the hybrid vehicle.

9. A hybrid vehicle comprising:
a drive comprising an internal combustion engine and an energy converter, wherein the energy converter comprises an electric machine operated for recuperation purposes;
a control unit comprising a computing unit and a memory unit; and
an operating element;
wherein the memory unit stores a program configured to:
glide the hybrid vehicle when the drive is not in a propulsion mode of operation and when an electric motor is operated in a recuperation intensity stage in a first drive state,
determine an actuation of the operating element,
determine whether a condition is present based on the actuation by determining a duration of the actuation of the operation element, comparing the duration to a time threshold value and determining whether the duration is below the time threshold value, and
if the condition is present, change over from the first drive state to a second drive state, and operate the hybrid vehicle in the second drive state.

10. The hybrid vehicle according to claim 9, wherein the operating element is a pedal, a selector lever, a manual switch, or a touch panel.

* * * * *